United States Patent
Heath et al.

(10) Patent No.: US 7,672,319 B1
(45) Date of Patent: Mar. 2, 2010

(54) INTEGRATED ROUTER/SWITCH-BASED MECHANISM FOR MAPPING COS VALUE TO QOS VALUE FOR OPTIMIZATION OF LAN-TO-WAN TRAFFIC FLOW

(75) Inventors: Jonathan William Heath, Madison, AL (US); Timothy James Schlichter, Huntsville, AL (US); Roberto Corzo Puon, Madison, AL (US); Amy Joan Puon, legal representative, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 1165 days.

(21) Appl. No.: 11/057,739

(22) Filed: Feb. 14, 2005

Related U.S. Application Data (63) Continuation-in-part of application No. 10/990,697, filed on Nov. 17, 2004.

(51) Int. Cl.
*H04L 12/28* (2006.01)
*G06F 13/20* (2006.01)

(52) U.S. Cl. .................. 370/401; 370/466; 710/313

(58) Field of Classification Search ............ 370/389, 370/466, 416
See application file for complete search history.

(56) References Cited

U.S. PATENT DOCUMENTS

| | | | |
|---|---|---|---|
| 5,588,003 A | 12/1996 | Ohba et al. ............ 370/468 |
| 5,968,126 A * | 10/1999 | Ekstrom et al. ........... 709/225 |
| 6,167,052 A * | 12/2000 | McNeill et al. ........... 370/399 |
| 6,658,457 B2 | 12/2003 | Nishikawa et al. ........ 709/206 |
| 7,417,995 B2 * | 8/2008 | Rabie et al. .............. 370/401 |
| 2002/0086705 A1 | 7/2002 | Yokoyama .............. 455/560 |
| 2002/0124207 A1 * | 9/2002 | Ohwada ................. 714/36 |
| 2003/0081625 A1 * | 5/2003 | Matsufuru .............. 370/412 |
| 2003/0223378 A1 | 12/2003 | Ishwar et al. ............ 370/254 |
| 2004/0218554 A1 | 11/2004 | Saint Etienne et al. .... 370/276 |
| 2004/0252722 A1 * | 12/2004 | Wybenga et al. .......... 370/474 |
| 2005/0025148 A1 * | 2/2005 | Johansson et al. ........ 370/389 |
| 2005/0073963 A1 * | 4/2005 | Goodfellow et al. ...... 370/255 |
| 2005/0157737 A1 * | 7/2005 | Rabie et al. ............. 370/416 |
| 2006/0050719 A1 | 3/2006 | Barr et al. .............. 370/401 |
| 2006/0095968 A1 | 5/2006 | Portolani et al. .......... 726/23 |
| 2006/0143300 A1 | 6/2006 | See et al. ............... 709/227 |

OTHER PUBLICATIONS

Parkhurst, William R.—Cisco OSPF Command and Configuration Handbook—Cisco Press 2002, pp. 83, 84, and 97.

* cited by examiner

*Primary Examiner*—Ayaz R Sheikh
*Assistant Examiner*—Mounir Moutaouakil
(74) *Attorney, Agent, or Firm*—Allen, Dyer, Doppelt, Milbrath & Gilchrist, P.A.

(57) ABSTRACT

An integrated processor-controlled router and switch fabric architecture provides connectivity between local area network (LAN) ports of an Ethernet switch serving a plurality of local area network users and a wide area network (WAN) interface that provides connectivity with the internet. Packets received from user ports of the Ethernet switch contain priority-representative information. Packets delivered by the processor-controlled router to the WAN interface are prioritized in accordance with the priority-representative information.

12 Claims, 7 Drawing Sheets

| CoS | DSCP |
|---|---|
| 0 | 0 |
| 1 | 8 |
| 2 | 16 |
| 3 | 24 |
| 4 | 32 |
| 5 | 40 |
| 6 | 48 |
| 7 | 56 |

| CoS | DE |
|---|---|
| 0 | 1 |
| 1 | 1 |
| 2 | 1 |
| 3 | 1 |
| 4 | 0 |
| 5 | 0 |
| 6 | 0 |
| 7 | 0 |

FIG. 11

INTEGRATED ROUTER/SWITCH-BASED MECHANISM FOR MAPPING COS VALUE TO QOS VALUE FOR OPTIMIZATION OF LAN-TO-WAN TRAFFIC FLOW

CROSS-REFERENCE TO RELATED APPLICATION

The present application is a continuation-in-part of co-pending U.S. patent application Ser. No. 10/990,697, filed Nov. 17, 2004, by R. Puon et al, entitled: "Integrated Router Switch Containing Mechanism for Automatically Creating IEEE 802.1β VLAN Trunks for LAN-to-WAN Connectivity," hereinafter referred to as the '697 application, assigned to the assignee of the present application, and the disclosure of which is incorporated herein.

FIELD OF THE INVENTION

The present invention relates in general to telecommunication systems and subsystems thereof, and is particularly directed to the incorporation of a class of service (COS) to quality of service (QOS) mapping scheme into an integrated router and switch fabric architecture of the type disclosed in the above-referenced '697 application, that maintains the intended prioritization of packets, as supplied from a local area network (LAN) to the switch fabric, at their point of delivery from the router to a wide area network.

BACKGROUND OF THE INVENTION

Figure 1:
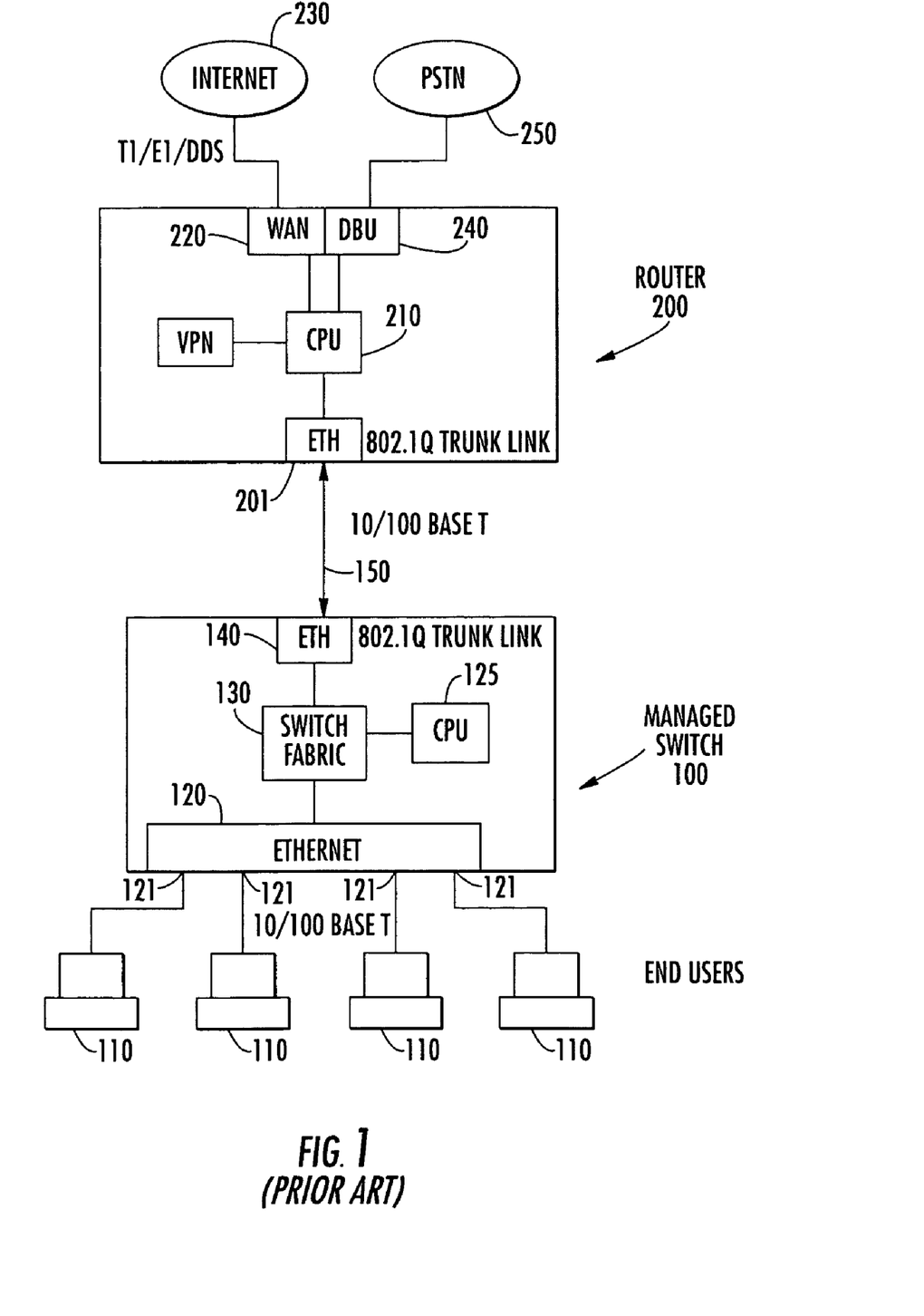
FIG. 1 is a reduced complexity block diagram of a conventional system architecture for providing connectivity between a plurality of user terminals of a local area network and the internet.

FIG. 1 diagrammatically illustrates a conventional 'segregated' system architecture containing a managed Ethernet layer-two switch subsystem 100 and a separate, layer-three edge router subsystem 200, that is configured to provide connectivity between a plurality of user terminals of a local area network (LAN), on the one hand, and a wide area network (WAN), such as the internet, on the other.

As shown therein, on the managed Ethernet layer-two switch subsystem side, a plurality of end user communication terminals 110 are connected to associated ports 121 of an Ethernet-based distribution switch 120. (Although the block diagram of FIG. 1 depicts only four user terminals 110 connected to the Ethernet-based distribution switch 120, it will be realized that in actuality the number of user terminals can be expected to be in the thousands; only four are shown in order to reduce the complexity of the illustration.)

Ethernet switch 120 is typically configured as a managed, layer-two switch, and is coupled to a processor (CPU 125)-controlled switch fabric chip 130 (such as a Broadcom BCM5645 Strataswitch) within the managed Ethernet switch subsystem 100. In the WAN direction, the switch fabric chip 130 is further coupled to an Ethernet port 140. Ethernet port 140 is coupled by way of a communication link 150 (configured as an IEEE 802.1Q trunk link) to an associated Ethernet port 201 of the separate, layer-three edge router subsystem 200.

Within layer-three edge router subsystem 200, Ethernet port 201 is coupled to the router's communication control processor chip (CPU) 210 (such as a Freescale MPC866 chip) which, in turn, is coupled to a wide area network (WAN) port 220. WAN port 220 provides a digital communication interface to a wide area network such as the internet 230, and to a dialed back-up unit 240, that provides auxiliary connectivity to public switched telephone network 250.

In order to accommodate data traffic among a large number of user terminals, advantage is taken of the ability of the managed layer-two Ethernet distribution switch 120 to subdivide the LAN into multiple virtual LANs (VLANs). This increases the efficiency of the network by reducing the broadcast traffic load, as each VLAN provides virtual isolation of traffic between itself and other VLANs. Once traffic intended for the internet leaves a VLAN, it is the task of the layer-three edge router subsystem 200 to route the traffic from the VLAN to the WAN.

Within the system shown in FIG. 1, the managed layer-two Ethernet distribution switch 120 has the ability to handle and prioritize traffic based on a class of service (COS) field within the Ethernet frame. As traffic traverses the local area network (LAN), frames marked with a higher COS will receive bandwidth priority over frames marked with a lower COS.

In a like manner, many layer-three routers have the ability to handle and prioritize traffic based upon the contents of prescribed fields within the IP header. Once such field is the differential services code point (DSCP) field. A packet that needs to be routed from the LAN across the wide area network (WAN) will be given priority if it matches a given criterion. Traffic that is competing for the same bandwidth, but does not match the criterion, will be given a lower priority. The priority is set in the DSCP header. The priority of traffic in a layer-three router is termed quality of service (QOS).

In a frame relay network, low priority traffic is marked by setting a discard eligibility (DE) bit in the frame relay header. As such, traffic that has its DE bit cleared (to zero), or reset, will take precedence over traffic with the bit set (to a one). A layer-three router located at the edge of the LAN and a frame relay network have the ability to set this bit in the course of assembling the frame relay header.

As shown in FIG. 1, the layer two managed Ethernet switch subsystem 100 and the layer-three edge router subsystem 200 have historically been isolated systems that prioritize traffic independently of one another, and are tied together by way of an IEEE 802.1Q VLAN trunk, which is the physical link that transports information from multi VLANs to the WAN and vice versa. Such a configuration is inherently limited, because the prioritization employed by the Ethernet switch has no visibility to the layer-three router subsystem and vice versa.

Figure 2:
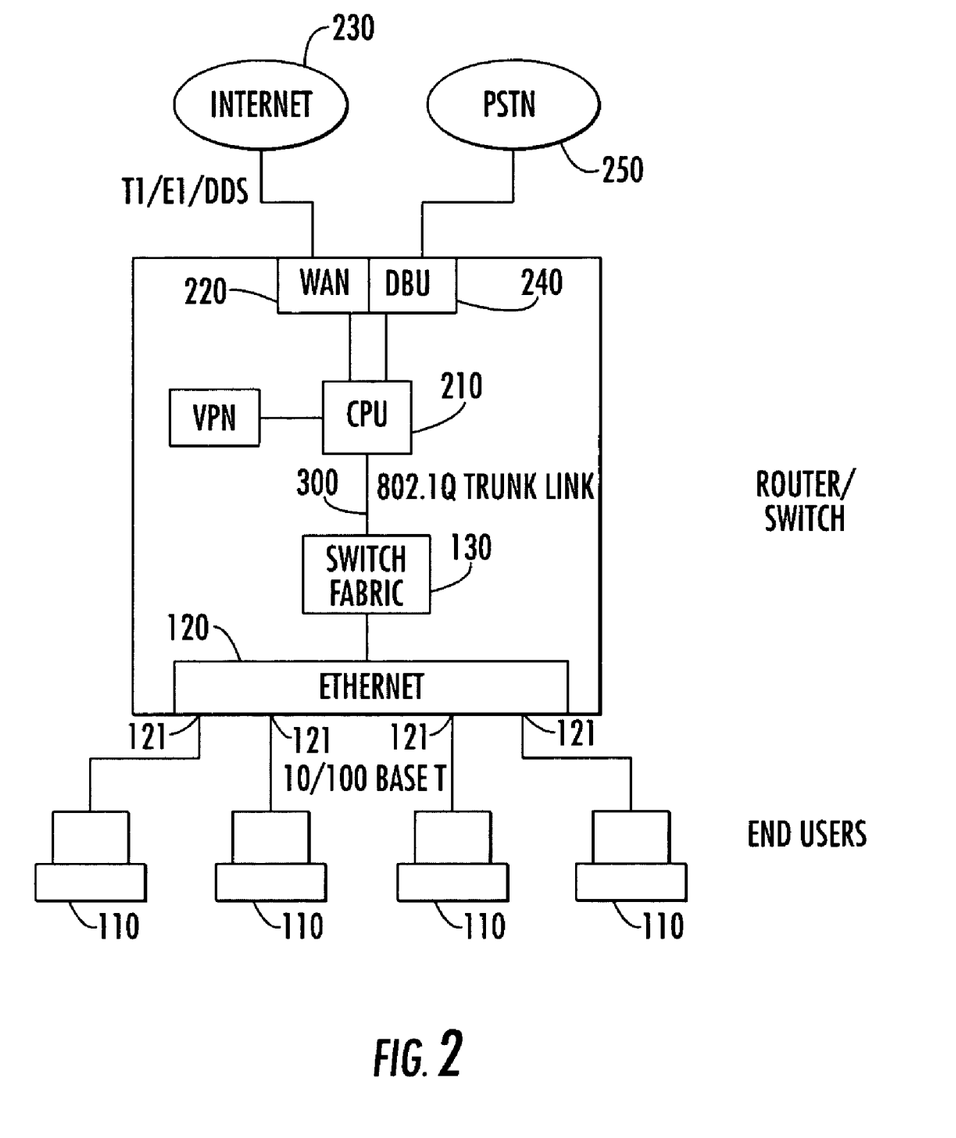
FIG. 2 is a reduced complexity block diagram of an integrated switch fabric—router system architecture in accordance with the present invention.

Advantageously, this and other shortcomings of conventional segregated router—managed switch systems of the type shown in FIG. 1 can be effectively obviated by the invention detailed in the above-referenced '697 application, which integrates the router and switch functions into a combined architecture of the type shown in FIG. 2. In accordance with this integrated router-switch architecture, throughput connectivity is provided between local area network (LAN) ports serving a plurality of local area network users and a wide area network (WAN) port that provides connectivity with the internet, by automatically creating IEEE 802.1Q virtual local area network (VLAN) trunks in response to a reduced set of command inputs.

More specifically, as in the segregated system architecture of FIG. 1, the integrated system architecture of FIG. 2 contains an (managed layer-two) Ethernet-based distribution switch 120, for providing connectivity between a plurality of user communication terminals 110 of a local area network and a switch fabric chip 130. (Again, as in the system diagram of FIG. 1, only four user terminals 110 are shown in FIG. 2, in order to reduce the complexity of the drawings, it being understood that in actuality the number of user terminals can be expected to be in the thousands. Also, as in the architecture of FIG. 1, switch fabric chip 130 may comprise a Broadcom BCM5645 Strataswitch.)

In the integrated architecture of FIG. 2, rather than being connected to a single user configurable Ethernet port through which access to a dedicated physical link to a further single user configurable Ethernet port in a separate router subsystem is afforded, the switch fabric chip 130 is coupled to a PCI bus 300 within the router/switch unit, through which communications with communication control processor chip (CPU) 210 are provided. As in the router subsystem 200 of FIG. 1, communication control processor chip 210 may comprise a Freescale MPC866 processor chip. The communication control processor chip 210, in turn, is coupled to a wide area network port 220, that provides a digital communication interface to the internet 230, and to a dialed back-up unit 240, that provides auxiliary connectivity to the public switched telephone network 250.

In addition, as in the system of FIG. 1, the managed layer-two Ethernet distribution switch 120 is used to subdivide the LAN into multiple virtual LANs (VLANs), with each VLAN providing virtual isolation of traffic between itself and other VLANs. Once traffic intended for the internet leaves a VLAN, it is the job of the integrated switch fabric/router to route the traffic from the VLAN to the WAN. However, unlike the architecture of FIG. 1, the switch fabric chip 130, which provides access to the VLANs, and the control processor 210, which performs the function of the edge router, are not isolated subsystems that are tied together by way of a dedicated physical IEEE 802.1Q VLAN trunk link. Instead, they are interfaced with each on the same motherboard by means of the PCI bus.

Pursuant to the invention disclosed in the '697 application, a virtual IEEE 802.1Q VLAN trunk link, that is functionally equivalent to the dedicated physical IEEE 802.1Q VLAN trunk link in the system of FIG. 1, is automatically created in response to the user issuing a prescribed set of commands to the communication control processor. These commands may be supplied to the control processor by way of a dial-up telecommunication link through the PSTN (DBU port) or by way of a web page browser via the internet (WAN port). The user commands and the responses they invoke are set forth in the state diagram example of FIG. 3, which shows the manner a SWITCH VLAN table is loaded with a pair of VLAN entries (x and y), and the CPU and SWITCH TAGGING states are loaded with tag entries supplied by the user.

Figure 3:
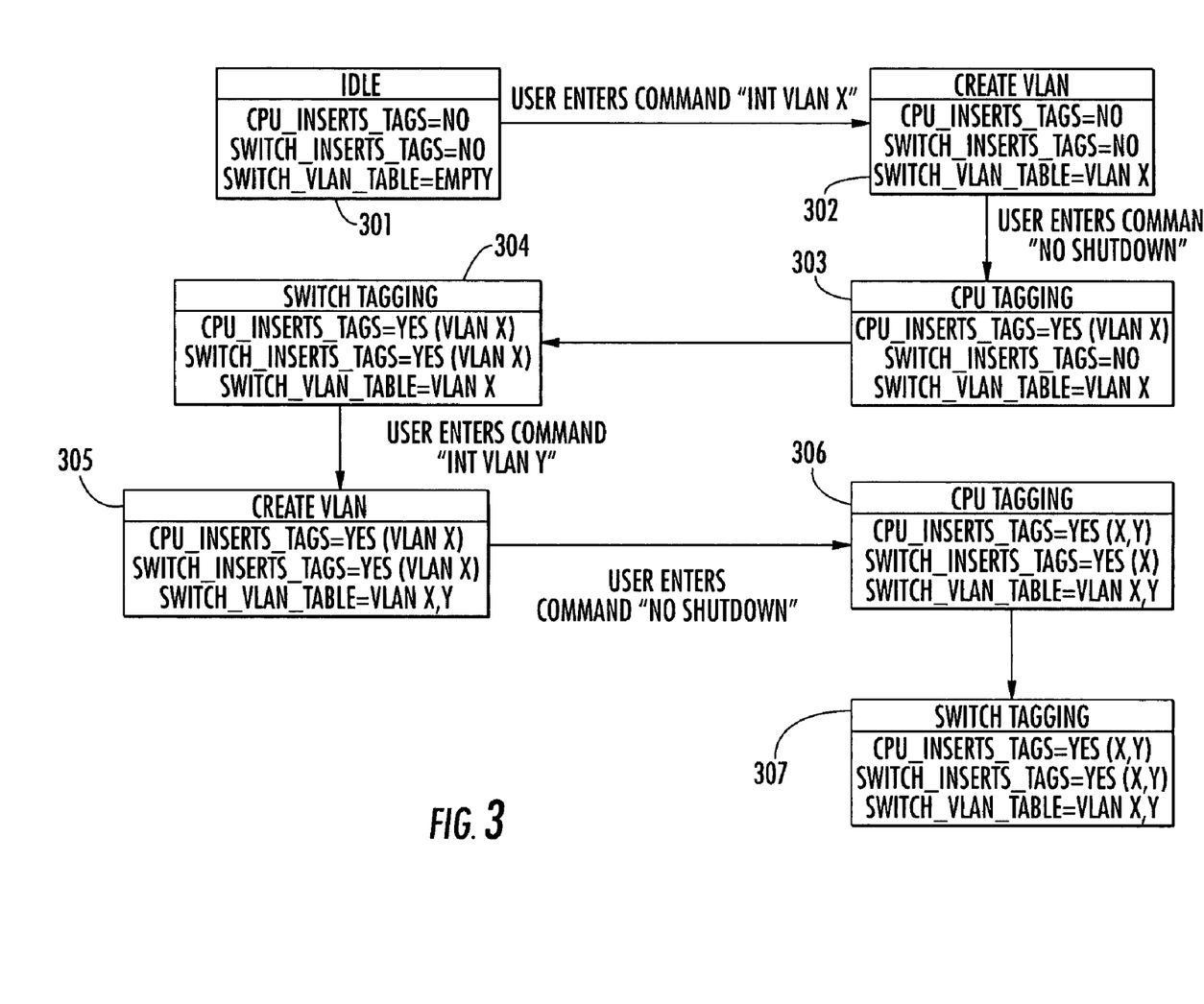
FIG. 3 is a state diagram shown the manner in which IEEE 802.1Q trunks are automatically created in response to prescribed user inputs in accordance with the present invention.

Referring to FIG. 3, the system is initially in an IDLE state 301. In this state, a VLAN table that is maintained within the switch fabric chip 130 is empty, as shown by the variable: SWITCH_VLAN_TABLE=EMPTY, Consequently, as shown by the variable: SWITCH_INSERTS_TAGS=NO, the switch fabric chip is not tagging packets destined for the control processor chip 210; also, as shown by the variable: CPU_INSERTS_TAGS=NO, control processor chip 210 is not tagging packets destined for the switch fabric chip 130.

With the system in its idle state 301, the user proceeds to enter the command "int vlan x" (where x is the VLAN number of the Ethernet port of interest for a prescribed user terminal). In response to this command, the control processor transitions to the CREATE VLAN state 302. In this state, the VLAN table in the switch fabric is updated with the number of the new VLAN that has been created by the user input command. Since the user has supplied the identification of a VLAN, that VLAN number is written into the VLAN table maintained in the switch fabric chip, by the processor performing the function of the variable: SWITCH_VLAN_TABLE=Vlan x. Since the processor chip is not yet tagging packets, the variable CPU_INSERTS_TAGS=NO, and since the switch fabric is not yet tagging packets, the variable SWITCH_INSERTS_TAGS=NO.

The user then enters the command "no shutdown", which initiates CPU TAGGING state 303 and SWITCH TAGGING state 304. In particular, in the CPU TAGGING state 302, the processor begins tagging packets destined for the switch fabric with the particular VLAN number that was created by the user. Here, the processor inserts the tag information supplied to the tag table, as denoted by the variable: CPU_INSERTS_TAGS=YES (vlan x). Since switch fabric tagging has not yet begun, the variable SWITCH_INSERTS_TAGS=NO. From CREATE VLAN state 301, the variable SWITCH_VLAN_TABLE=Vlan x.

In the SWITCH TAGGING state 304, the switch fabric begins tagging packets destined for the CPU with the particular VLAN number that has been supplied by the user. Thus, the variable: SWITCH_INSERTS_TAGS=YES (vlan x). Also, from the previous two states 302 and 303, the variable: CPU_INSERTS_TAGS=YES (vlan x) and the variable: SWITCH_VLAN_TABLE=Vlan x. With the variables of the CPU and SWITCH TAGGING states loaded with numerical Vlan identifications, traffic flowing between the control processor (CPU) and the switch fabric will have a VLAN tag appended to the frames as defined in IEEE 802.1Q. However, the process of performing the tagging and complying with IEEE 802.1Q has been accomplished without the user having to set all the variables. Loading of the requisite variables for the CPU and SWITCH tagging states has been performed automatically. Namely, the task of creating the IEEE 802.1Q VLAN trunk is no longer carried out by the user, but rather by the communication control processor.

In the example of configuring a LAN-to-WAN connection for a pair of VLANs, as the completion of the SWITCH TAGGING state 304, the user enters a new vlan tag command having a new vlan number (y) as: "int vlan y, (where y is the VLAN number of the Ethernet port of interest for another prescribed user terminal). In response to this command, the control processor transitions to the next CREATE VLAN state 305. As was the case for state 302, in CREATE VLAN state 305, the VLAN table in the switch fabric is updated with the new VLAN number that has been created by the user command. In particular, the new VLAN number (y) is written into the VLAN table maintained in the switch fabric chip, by the processor performing the function of the variable: SWITCH_VLAN_TABLE=Vlan x, y. Since the processor chip has begun tagging packets, the variable CPU_INSERTS_TAGS=YES (vlan x), and the variable SWITCH_INSERTS_TAGS=YES (vlan x).

Next, the user again enters the command "no shutdown", which initiates CPU TAGGING state 306 and SWITCH TAGGING state 307. In CPU TAGGING state 306, the processor inserts new tag information supplied to the tag table, as denoted by the variable: CPU_INSERTS_TAGS=YES (x, y). Since switch fabric tagging has begun, the variable SWITCH_INSERTS_TAGS=YES (x). From state CREATE VLAN state 305, the variable SWITCH_VLAN_TABLE=Vlan x, y.

Finally, in the SWITCH TAGGING state 307, wherein the switch fabric tags packets destined for the CPU with the particular VLAN numbers supplied by the user, the variable: SWITCH_INSERTS_TAGS=YES (x, y). Also the variable: CPU_INSERTS_TAGS=YES (x, y) and the variable: SWITCH_VLAN_TABLE=Vlan x, y.

From the foregoing description of FIGS. 2 and 3, it will be appreciated that the integrated router and switch fabric system of the '697 application has two essential aspects that differentiate it from the prior art system of FIG. 1. The first is the fact that it has no physical trunk between the switch fabric and the router. Instead, a virtual IEEE 802.1Q trunk is created through software to provide connectivity between the switch fabric and the router's control processor. This means that the integrated switch fabric treats the processor interface back to the router just like a regular LAN port. Secondly, the virtual IEEE 802.1Q trunk is automatically generated by the router's control processor whenever a VLAN interface is created, by the user initiating the configuration of a LAN-to-WAN connection from a particular VLAN. All traffic flowing over this link have VLAN tags appended to the frames as defined in accordance with IEEE 802.1Q protocol.

SUMMARY OF THE INVENTION

In accordance with the present invention, advantage is taken of the above-described features of the integrated architecture of FIG. 2, to provide a class of service (COS) to quality of service (QOS) mapping scheme that maintains the intended prioritization of packets, as supplied from a local area network (LAN) to the switch fabric, at their point of delivery from the router to a wide area network.

Pursuant to a first embodiment, for the case of COS-to-DSCP mapping, the switch fabric reads the COS field within the incoming frame supplied by the LAN. Before sending the frame to the CPU, the switch fabric maps the COS value into a prescribed DSCP value, thereby retaining the high priority designation on the frame. The high priority Ethernet frame is forwarded to the CPU, which routes it out the WAN port. In the course of this operation, the CPU examines the layer-three packet and sees the mapped DSCP value. The CPU then prioritizes the packet and routes it accordingly. Thus, the layer-two COS marking has been mapped to a layer-three QOS marking, and the packet has been prioritized for transport over the LAN-to-WAN datapath pursuant to the original COS priority.

Pursuant to a second embodiment, for the case of COS-to-DE mapping, the switch fabric prioritizes the packet based upon the COS field and retains the COS setting and sends the packet with its COS setting to the CPU. The CPU examines the COS setting and sets the frame relay bit DE accordingly. If the COS priority is set to a value below a user-configurable level, the CPU will set the DE bit, thereby retaining a low priority designation on that packet.

DETAILED DESCRIPTION

Before describing the integrated router/switch-based mechanism for mapping a COS value to a QOS value for optimization of LAN-TO-WAN traffic flow in accordance with the present invention, it should be observed that the invention resides primarily in a prescribed novel combination of conventional digital communication chip sets, as detailed in the above-referenced '697 application, and control software therefor. Consequently, the configurations of such chip sets and the manner in which they may be interfaced with conventional communication interface components and circuits have, for the most part, been illustrated by readily understandable schematic block diagrams, which show only those specific features that are pertinent to the present invention, so as not to obscure the disclosure with details which will be readily apparent to those skilled in the art having the benefit of the description herein. Thus, the block diagrams and header field diagrams presented here are primarily intended to show major components of an embodiment of the invention in a convenient functional grouping, whereby the present invention may be more readily understood.

Figure 4:
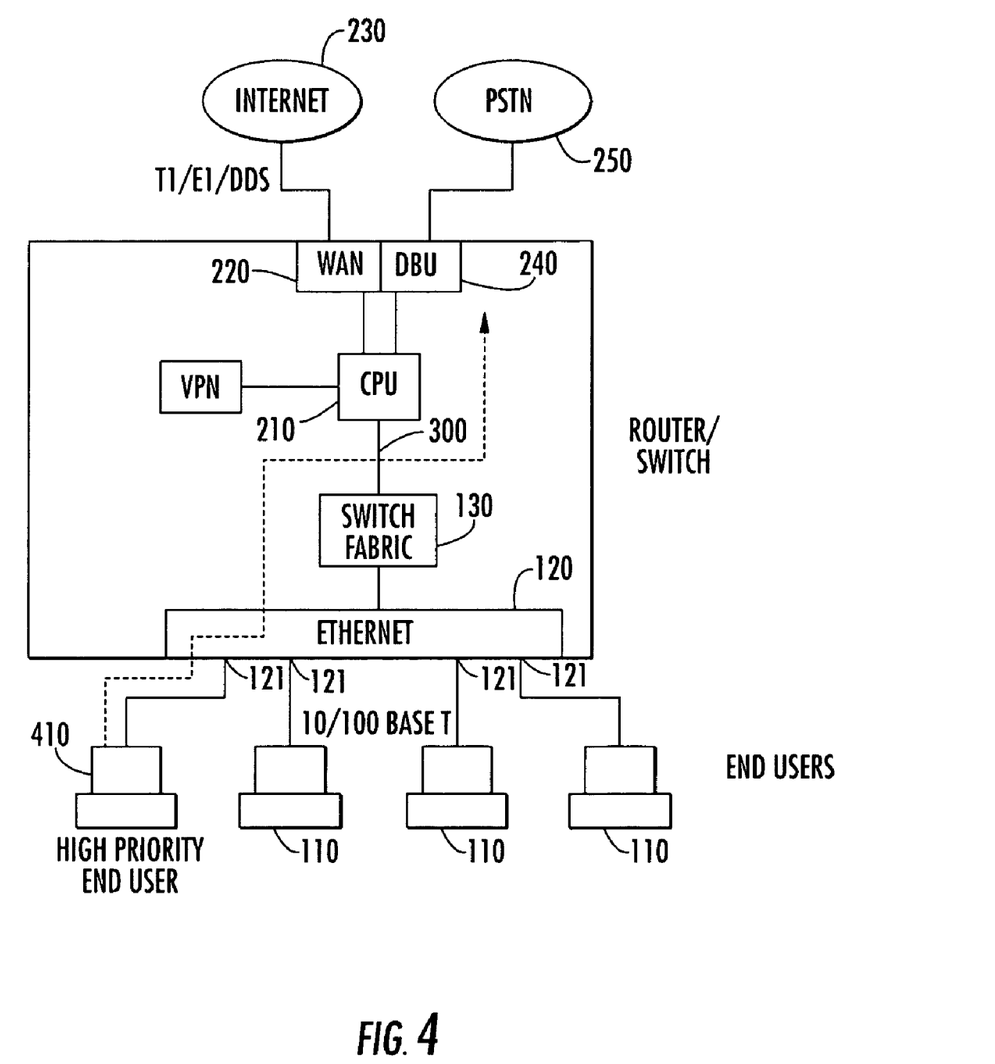
FIG. 4 shows the travel path employed by the integrated router-switch system architecture of FIG. 2 to map prioritized traffic incoming from the LAN and passing through the system's communications control processor for delivery as prioritized traffic at a WAN port.

Attention is now directed to the FIG. 4, which shows the travel path through the integrated router-switch system architecture of FIG. 2 wherein prioritized traffic incoming from the LAN and passing through the system's communications control processor (CPU) 210 is mapped for delivery as prioritized traffic at the WAN port 220. As a non-limiting illustration, FIG. 4 shows a high priority end user (such as a voice over data terminal) 410 coupled to an arbitrary port (e.g., port 1) of the layer-two Ethernet switch 120.

Figure 5:
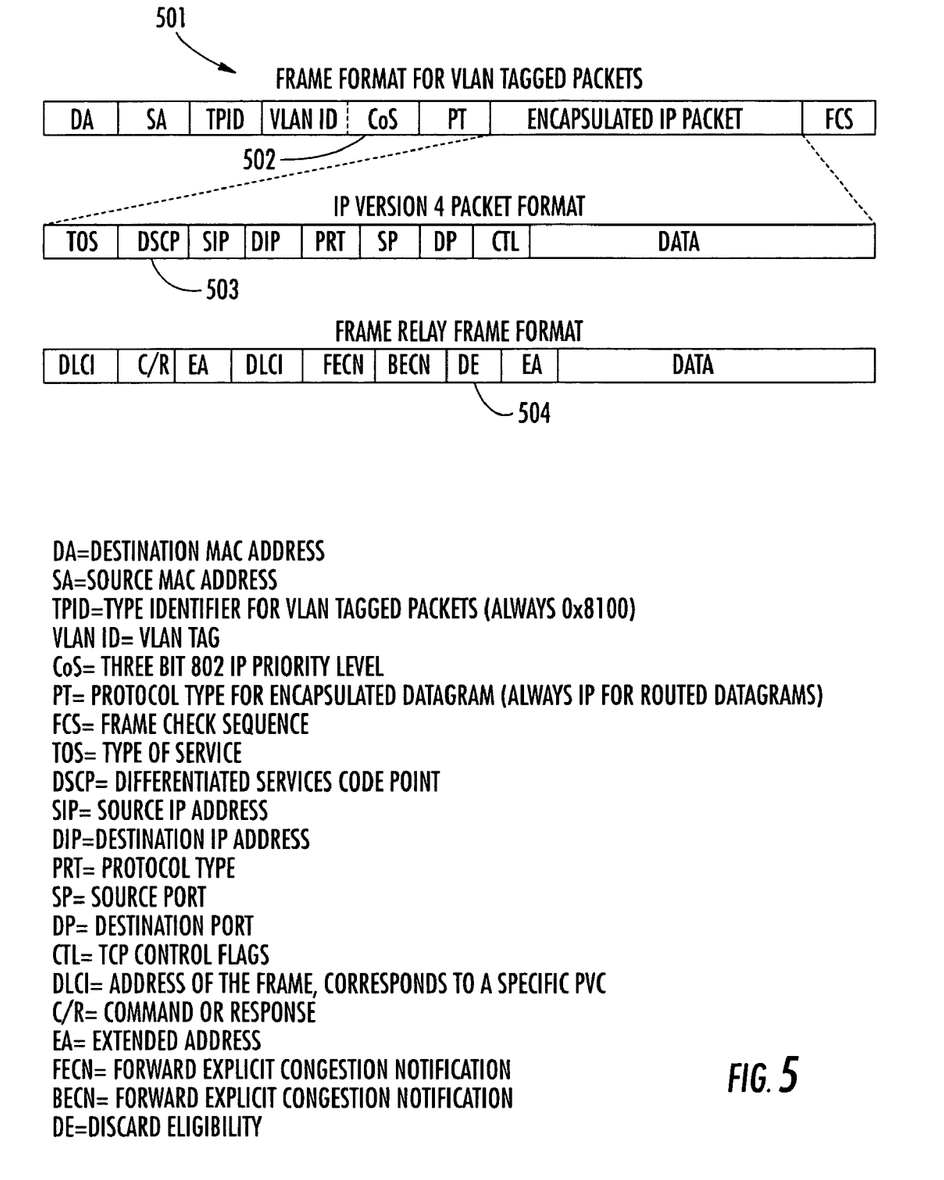
FIG. 5 shows the manner in which the frame format for a VLAN tagged packet may be mapped into an IP version 4 packet format and a frame relay frame format.
Figure 6:
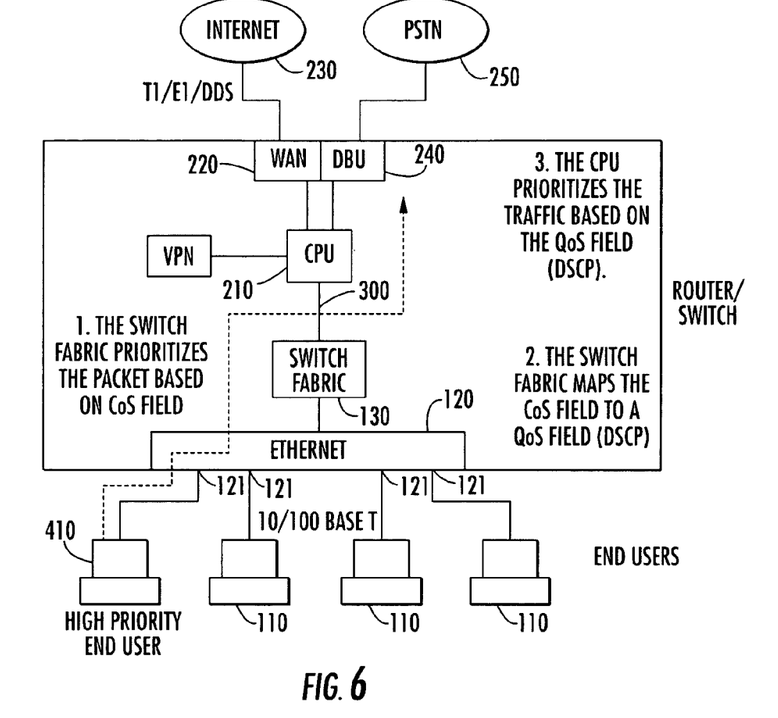
FIG. 6 illustrates the packet flow through the integrated switch/router of FIG. 4, as a COS value is mapped by the switch fabric into a DSCP value.
Figure 7:
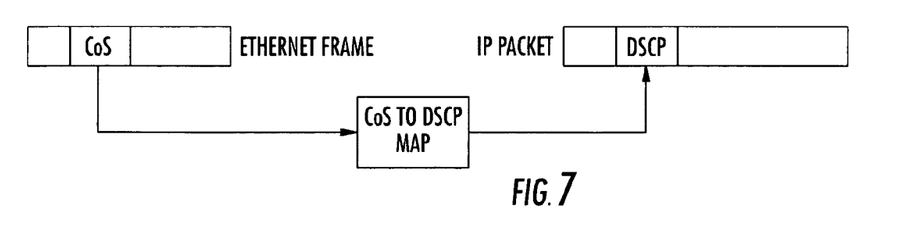
FIG. 7 shows the mapping operation carried out by the switch fabric of the embodiment of FIG. 4 to translate a COS value into a DSCP value.
Figure 8:
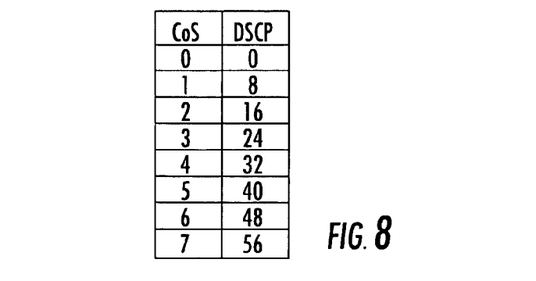
FIG. 8 shows an example of the mapping of a table of COS values into associated DSCP values.

As supplied to the switch fabric 130 by the Ethernet switch 120, the frame format of a respective VLAN tagged packet may typically correspond to the frame format shown at 501 in FIG. 5. Pursuant to a first embodiment of the present invention (shown in FIG. 6), for the case of COS-to-DSCP mapping, the switch fabric 130 reads the COS field 502 within the frame and, as shown in FIG. 7, maps the COS field into a DSCP field 503 within the encapsulated IP packet portion of the IP packet. FIG. 8 is a table showing a non-limiting example of the use of a three bit COS field (yielding eight values 0-7) to realize an associated set of eight DSCP values. CPU 210 then proceeds to prioritize the IP packet based upon the mapped QOS field as supplied to it by switch fabric 130, for delivery to the WAN port 220. (In the course of examining the COS field 502 of an incoming Ethernet frame, the switch fabric 130 will place higher priority frames into a high priority queue of a set of different priority queues dedicated for the purpose. Frames within the high priority queue will be passed to the CPU 210 before frames in a lower priority queue.)

Namely, before sending the frame to the CPU 210, the switch fabric 130 maps the COS value 502 into a prescribed DSCP value, as shown at 503 in FIG. 5, thereby retaining the high priority designation on the frame. The high priority Ethernet frame is forwarded to the CPU, which routes it out the WAN port 220. In the course of this operation, the CPU 210 examines the layer-three packet and sees the mapped DSCP value 503. The CPU then prioritizes the packet and routes it accordingly. Thus, the layer-two COS marking has been mapped to a layer-three QOS marking, and the packet has been prioritized for transport over the entire LAN-to-WAN datapath pursuant to the original COS priority.

Figure 9:
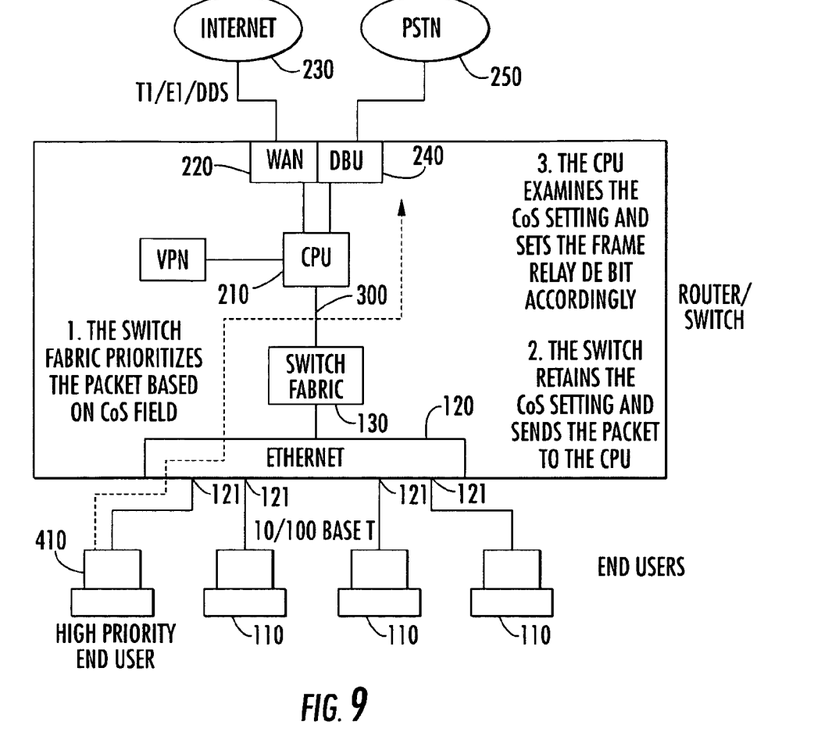
FIG. 9 shows the packet flow through the integrated switch/router of FIG. 4 as a COS value is mapped by the router CPU into a DE bit.
Figure 10:
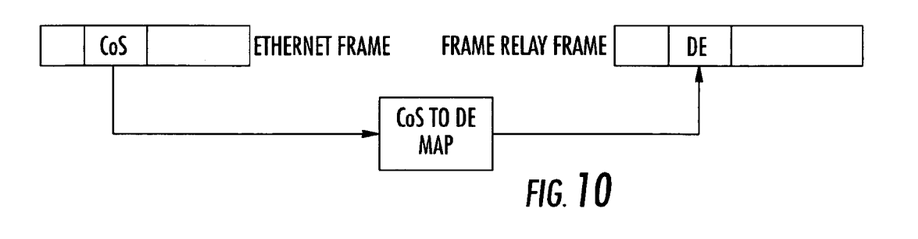
FIG. 10 shows the mapping operation carried out by the CPU router of the embodiment of FIG. 9 to translate a COS value into a DE value.
Figure 11:
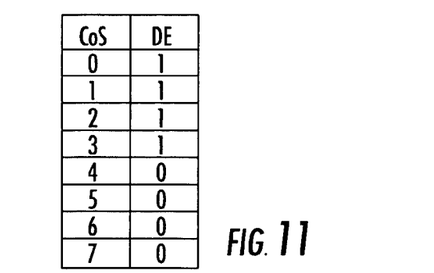
FIG. 11 shows an example of the mapping of a table of COS values into associated DE values.

Pursuant to a second embodiment of the present invention (shown in FIG. 9), for the case of COS-to-DE mapping, the switch fabric 130 prioritizes the packet based upon the COS field 502 and retains the COS setting and sends the packet with its COS setting to the CPU. The CPU 210, in turn, examines the COS setting and sets the frame relay bit DE 504 accordingly. More particularly, the switch fabric 130 retains the COS value that was originally assigned to the frame, and forwards the frame with that COS value to the CPU 210. When routing the packet out the frame relay network, the CPU proceeds to map the COS value to the frame relay DE bit, as shown in FIG. 10. For the present example of employing a three bit COS field, the four lower values 0-3 are considered upper priority values, while the four upper values 4-7 are considered lower priority values. Thus, as shown in the mapping table of FIG. 11, COS values 0-3 are mapped to a DE bit value of '1', while COS values 4-7 are mapped to a DE bit value of '0'. If the COS priority is set to a value below a user-configurable level, the CPU will set the DE bit, thereby retaining a low priority designation on that packet.

As will be appreciated from the foregoing description, the present invention takes advantage of the layer-three router and layer-two Ethernet switch features of the integrated architecture of the above-referenced '697 application, to provide a class of service (COS) to quality of service (QOS) mapping scheme that maintains the intended prioritization of packets, as supplied from a local area network (LAN) to the switch fabric, at their point of delivery from the router to a wide area network. This provides improved visibility for the layer-three router into the COS prioritization that is performed at layer two. This added visibility yields better optimization for traffic flow from the LAN to the WAN.

While we have shown and described several embodiments in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A system for controllably routing packetized information traffic from user terminals of a local area network (LAN) to a wide area network (WAN) interface to the internet, said system comprising an integrated router and switch fabric architecture, and comprising:
   an Ethernet switch having a plurality of ports that are adapted to receive, from said user terminals of said LAN, packets containing priority-representative information; and
   a processor and switch fabric coupled to said Ethernet switch and being operative to route packets from said Ethernet switch, as sourced thereto from user terminals for delivery to said WAN interface, and to route packets supplied thereto to said Ethernet switch for delivery via ports thereof to destination user terminals, wherein said processor is connected between said switch fabric and WAN, and further comprising a motherboard on which the processor and switch fabric are positioned and a PCI bus interfacing both the processor and switch fabric, and wherein packets delivered by said processor to said WAN interface are prioritized in accordance with said priority-representative information, wherein said priority-representative information corresponds to a class of service (COS) field and said switch fabric prioritizes a packet based upon its COS field and retains said COS field in the course of forwarding packets to said processor, wherein said processor sets a frame relay discard eligibility (DE) bit for delivery to said WAN interface as a COS-to-DE mapping based on the COS field of a packet received thereby from said switch fabric and based on an "n" bit COS field having lower "n" bit values as one of upper or lower priority values; a monitoring terminal coupled to one of the plurality of ports of said Ethernet switch, and configured to monitor all traffic between said WAN interface and plurality of ports of said Ethernet switch and mirror traffic between said WAN interface and said plurality of ports of said Ethernet switch to said monitoring terminal, and wherein connectivity between said processor and said switch fabric is established by way of a virtual trunk link therebetween without a user-configurable physical link, wherein said processor and switch fabric are automatically configured by said processor in response to virtual LAN (VLAN) address-containing user commands to insert VLAN tags into frames wherein the VLAN tags correspond to VLAN data that identify VLAN's for transport of communication signals transported from said router to said switch fabric, and from said switch fabric to said router.

2. The system according to claim 1, wherein said switch fabric is operative to map said COS field into a quality of service (QOS) field.

3. The system according to claim 2, wherein said QOS field corresponds to a differentiated services code point (DSCP) field.

4. The system according to claim 2, wherein said processor-based router is operative to prioritize packets for delivery to said WAN interface based upon their QOS fields.

5. A method for controllably routing packetized information traffic from user terminals of a local area network (LAN) to a wide area network (WAN) interface to the internet using an integrated router and switch fabric architecture, comprising the steps of:
   (a) interfacing a plurality of ports of an Ethernet switch with user terminal-sourced packets containing priority-representative information;
   (b) coupling said Ethernet switch to a switch fabric and causing said switch fabric to route packets from said Ethernet switch, as sourced thereto from user terminals, to a processor for delivery to said WAN interface and to route packets supplied thereto to said Ethernet switch for delivery via ports thereof to destination user terminals wherein said processor is connected between said switch fabric and WAN, and further comprising a motherboard on which the processor and switch fabric are positioned and a PCI bus interfacing both the processor and switch fabric; and
   (c) causing packets delivered by said processor to said WAN interface to be prioritized in accordance with said priority-representative information, wherein said priority-representative information corresponds to a class of service (COS) field and said switch fabric prioritizes a packet based upon its COS field and retains said COS field in the course of forwarding packets to said processor, wherein said processor sets a frame relay discard eligibility (DE) bit for delivery to said WAN interface as a COS-to-DE mapping based on the COS field of a packet received thereby from said switch fabric and based on an "n" bit COS field having lower "n" bit values as one of upper or lower priority values and monitoring traffic using a monitoring terminal coupled to one of the plurality of ports of said Ethernet switch, and configured to monitor all traffic between said WAN interface and plurality of ports of said Ethernet switch and mirror traffic between said WAN interface and said plurality of ports of said Ethernet switch to said monitoring terminal, wherein connectivity between said processor and said switch fabric is established by way of a virtual trunk link therebetween without a user-configurable physical link, wherein said processor and switch fabric are automatically configured by said processor in response to virtual LAN (VLAN) address-containing user commands to insert VLAN tags into frames wherein the VLAN tags correspond to VLAN data that identify VLAN for transport of communication signals transported from said router to said switch fabric, and from said switch fabric to said router.

6. The method according to claim 5, wherein said switch fabric is operative to map said COS field into a quality of service (QOS) field.

7. The method according to claim 6, wherein said QOS field corresponds to a differentiated services code point (DSCP) field.

8. The method according to claim 6, wherein said processor-based router is operative to prioritize packets for delivery to said WAN interface based upon their QOS fields.

9. In a system for routing packetized information traffic between user terminals of a local area network (LAN) and a wide area network (WAN) interface to the internet, said system comprising an integrated router and switch fabric architecture and including an Ethernet switch having a plurality of ports that are adapted to be coupled to said user terminals, and a processor and a switch fabric coupled to said Ethernet switch that is operative to route packets from said Ethernet switch as sourced thereto from user terminals to said processor for delivery to said WAN interface and to route packets supplied thereto to said Ethernet switch for delivery via ports thereof to destination user terminals, wherein said processor is connected between said switch fabric and WAN, and further comprising a motherboard on which the processor and switch fabric are positioned and a PCI bus interfacing both the processor and switch fabric, said packets containing priority-representative information, the improvement comprising:

causing packets delivered by said processor-based router to said WAN interface to be prioritized in accordance with said priority-representative information, wherein said priority-representative information corresponds to a class of service (COS) field and said switch fabric prioritizes a packet based upon its COS field and retains said COS field in the course of forwarding packets to said processor, wherein said processor sets a frame relay discard eligibility (DE) bit for delivery to said WAN interface as a COS-to-DE mapping based on the COS field of a packet received thereby from said switch fabric and based on an "n" bit COS field having lower "n" bit values as one of upper or lower priority values; a monitoring terminal coupled to one of the plurality of ports of said Ethernet switch, and configured to monitor all traffic between said WAN interface and plurality of ports of said Ethernet switch and mirror traffic between said WAN interface and said plurality of ports of said Ethernet switch to said monitoring terminal, and wherein connectivity between said processor and said switch fabric is established by way of a virtual trunk link therebetween without a user-configurable physical link, wherein said processor and switch fabric are automatically configured by said processor in response to virtual LAN (VLAN) address-containing user commands to insert VLAN tags into frames wherein the VLAN tags correspond to VLAN data that identify VLAN's for transport of communication signals transported from said router to said switch fabric, and from said switch fabric to said router.

10. The improvement according to claim 9, wherein said switch fabric is operative to map said COS field into a quality of service (QOS) field.

11. The improvement according to claim 10, wherein said QOS field corresponds to a differentiated services code point (DSCP) field.

12. The improvement according to claim 10, wherein said processor-based router is operative to prioritize packets for delivery to said WAN interface based upon their QOS fields.

* * * * *